(12) United States Patent
Lyon (10) Patent No.: US 11,187,375 B2
(45) Date of Patent: Nov. 30, 2021

(54) REUSABLE HANGER CLIPS AND ASSOCIATED METHODS

(71) Applicant: 1323591 ALBERTA LTD., Airdrie (CA)

(72) Inventor: Bruce Lyon, Airdrie (CA)

(73) Assignee: 1323591 Alberta Ltd., Airdrie (CA)

( * ) Notice: Subject to any disclaimer, the term of this patent is extended or adjusted under 35 U.S.C. 154(b) by 61 days.

(21) Appl. No.: 16/757,499

(22) PCT Filed: Aug. 1, 2018

(86) PCT No.: PCT/CA2018/050940
§ 371 (c)(1),
(2) Date: Apr. 20, 2020

(87) PCT Pub. No.: WO2019/084670
PCT Pub. Date: May 9, 2019

(65) Prior Publication Data
US 2020/0248866 A1 Aug. 6, 2020

Related U.S. Application Data

(60) Provisional application No. 62/580,247, filed on Nov. 1, 2017.

(51) Int. Cl.
*F16M 13/02* (2006.01)
*F21V 21/088* (2006.01)

(52) U.S. Cl.
CPC ......... *F16M 13/022* (2013.01); *F21V 21/088* (2013.01)

(58) Field of Classification Search
CPC combination set(s) only.
See application file for complete search history.

(56) References Cited

U.S. PATENT DOCUMENTS 3,665,583 A * 5/1972 Helderman ............. B25C 1/126
29/254
5,964,489 A * 10/1999 Mahoney ................. B25J 1/04
248/339
6,227,584 B1   5/2001 Reuther
(Continued)

OTHER PUBLICATIONS

OHSA Fact Sheet: Reducing Falls in Construction: Safe Use of Stepladders, Occupational Safety and Health Administration, May 2013.
(Continued)

*Primary Examiner* — Monica E Millner
(74) *Attorney, Agent, or Firm* — Siritzky Law, PLLC (57) ABSTRACT

A hanger clip is disclosed comprising: a housing and a clip member for attaching the hanger to a surface or protrusion. The clip member is connected to the housing and comprises a follower, wherein the clip member is configured to move between an open configuration and a closed configuration based on the position of the follower. The housing and clip are configured to receive a cam member which is configured to rotate within the housing to change the position of the follower to move the clip member between an open configuration and a closed configuration. The hanger clip can therefore be remotely actuatable using a tool attached to a pole which can be manipulated from ground level.

16 Claims, 9 Drawing Sheets

(56) References Cited

U.S. PATENT DOCUMENTS

| | | | | |
|---|---|---|---|---|
| 6,473,953 B1* | 11/2002 | Portnoff | ................... | B25B 5/06 |
| | | | | 269/3 |
| 6,572,062 B1* | 6/2003 | Limber | ................ | F21V 21/088 |
| | | | | 248/227.1 |
| 7,252,210 B1* | 8/2007 | Schultz | ................ | B65D 83/203 |
| | | | | 222/174 |
| 8,459,712 B2* | 6/2013 | Thrasher | ................ | B25B 31/00 |
| | | | | 294/209 |
| 8,752,877 B2* | 6/2014 | Spindler | ............. | F21V 21/0808 |
| | | | | 294/209 |
| 9,056,393 B1 | 6/2015 | Gary et al. | | |
| 2003/0230686 A1 | 12/2003 | Vasquez et al. | | |
| 2009/0095848 A1 | 4/2009 | Holbrook et al. | | |
| 2010/0225130 A1 | 9/2010 | Thrasher, Jr. et al. | | |
| 2012/0284997 A1* | 11/2012 | Morin | ...................... | G01R 1/22 |
| | | | | 29/525.01 |
| 2013/0333197 A1* | 12/2013 | Schulte | ................ | F21V 21/088 |
| | | | | 29/525.08 |
| 2016/0190781 A1 | 6/2016 | Hendricks | | |

OTHER PUBLICATIONS

WIPO, International Search Report and Written Opinion for PCT/CA2018/050940 dated Oct. 25, 2018.

\* cited by examiner

REUSABLE HANGER CLIPS AND ASSOCIATED METHODS

RELATED APPLICATIONS

This application is a 371 of International application PCT/CA2018/050940, filed Aug. 1, 2018, which claims priority from U.S. Provisional application No. 62/580,247, Nov. 1, 2017, the entire contents of both of which are hereby fully incorporated herein by reference for all purposes.

FIELD OF THE INVENTION

The invention relates to devices for the attachment of ornaments (e.g. Christmas lights or other temporary ornaments) to surfaces and protrusions such as gutters, shingles and fascia of buildings.

BACKGROUND

Hanging Christmas lights is a common tradition in North America, Europe and around the world. There are a few different ways of attaching the lights to the front of a building. The most common is to attach them by a plastic clip to gutters while standing on a ladder.

U.S. Pat. No. 9,056,393 discloses an apparatus for installing a string of decorative lighting, such as Christmas or party lights, in an elevated location without requiring the use of a ladder. A clamp, actuated between an open and closed position, securely holds the light string by a socket rather than the wire string, while the light string is being hung. The clamp preferably includes prongs oriented in different directions, one direction adapted for hanging a string of lights with a hook-type hanging bracket and the other direction adapted for use with a clip-type hanger. A protective body covers the bulb while the light string is being hung.

A clamping type hanger, such as that disclosed in U.S. Pat. No. 6,227,584, that is permanently attached to a pole is also known. U.S. Pat. No. 6,227,584 relates to a string of lights hanging apparatus including a telescoping handle comprised of a lower section, an upper section, and an intermediate section. A clamping mechanism is secured to a free end of the upper section of the telescoping handle. The clamp mechanism includes a fixed arm which extends outwardly from the handle; and a pivoting arm. An inner end of the pivoting arm is pivotally coupled with an inner end of the fixed arm. A trigger mechanism is secured to the lower section of the telescoping handle and controls a cable. A free end of the cable is secured to the pivoting arm of the clamping mechanism whereby inward pressure of the trigger mechanism will cause the pivoting arm to compress the spring and engage the fixed arm.

SUMMARY

In accordance with the present disclosure, there is provided a hanger clip comprising:
a housing,
a clip member connected to the housing and comprising a follower, wherein the clip member is configured to move between an open configuration and a closed configuration based on the position of the follower;
wherein the housing and clip member are configured to receive a cam member which is configured to rotate within the housing to change the position of the follower to move the clip member between an open configuration and a closed configuration.

The clip member may comprise an engaging portion, a follower portion and a pivot portion. The engaging portion may be an elongate portion configured to engage with a surface or protrusion. The follower portion may be positioned between the pivot portion and the engaging portion. The pivot portion may allow the engaging portion to rotate in a plane (e.g. a single plane) about the pivot. The follower portion may be smooth so as to allow sliding on the surface of a cam.

By the clip member moving with respect to the housing, the clip member (e.g. the engaging portion) can close to trap a surface or protrusion (e.g. between the clip member and the outside of the housing or other support structure) and open to release the trapped surface or protrusion.

The clip member may be pivotably connected to the housing. The clip member may comprise an elongate arm. The pivot may comprise a joint and/or a resilient portion which allows the clip member to rotate with respect to the housing.

The hanger clip may comprise a biasing means configured to bias the clip member in a closed configuration. The biasing means may comprise a spring. The biasing means or spring may be formed from a resilient portion of material connecting the clip member to the housing. The resilient portion may be formed of plastic or metal.

The housing may comprise one or more stops configured to restrict rotational motion of the cam member within the housing. For example, the stop may be configured to stop the cam member in a position in which the clip member is configured to exert a force on the cam member to hold it in position.

The clip member may be configured to exert a force on an exterior portion of the housing when in the closed position.

The clip member may extend towards a hole (or slot) through which the cam member is received (e.g. the engagement portion may be closer to the hole than the pivot portion). The clip member may extend away from a hole (or slot) through which the cam member is received.

The clip hanger may comprise one or more fixed clip members configured to restrict rotation of the clip hanger when the clip member is in the open configuration.

The distance between the housing and the adjustable clip member in the closed position may be less than the distance between the housing and the fixed clip member. The distance between the housing and the adjustable clip member in the open position may be more than the distance between the housing and the fixed clip member (and, for example, less than ten times the distance between the housing and the fixed clip member).

At least a said clip member (e.g. fixed and/or adjustable clip member) may be flared. This may help guide the clip to the correct position when being mounted on, for example, a protrusion.

The clip may comprise an ornament connector. The ornament connector may be configured to hold ornaments such as Christmas lights or Hallowe'en decorations.

The clip may be formed from polypropylene plastic. The clip may be injection molded. The clip may be of unitary construction (one piece). the housing and clip member may be releasably connected together by an engagement member. The clip may be of two-part construction.

In some embodiments, the cam member may be permanently housed or received within the housing and activated to rotate to move the follower (e.g. by a pole being inserted into the housing to connect with the permanently-housed cam member).

Another aspect of the present technology is the method of using an clip as described herein to attach the clip to a protrusion or surface.

For convenience, directions have been defined with respect to the rotational axis of the cam member: longitudinal corresponds with directions aligned with the rotational axis; and transverse corresponds with directions which cross the rotational axis.

BRIEF DESCRIPTION OF THE DRAWINGS

Various objects, features and advantages will be apparent from the following description of particular embodiments, as illustrated in the accompanying drawings. The drawings are not necessarily to scale, emphasis instead being placed upon illustrating the principles of various embodiments of the present disclosure. Similar reference numerals indicate similar components.

FIG. 6b is a longitudinal cross-section of the clip hanger of FIG. 6a.

FIG. 6c is a perspective view of the cam member for the clip hanger of FIG. 6a.

FIGS. 8a and 8b are perspective and cross-section views of a further embodiment of a clip hanger.

FIG. 8c is a perspective view of a plug holder which can be used in conjunction with the embodiment of FIG. 8a.

FIGS. 8d-f are perspective views of the plug holder of FIG. 8c being used in conjunction with the embodiment of FIG. 8a.

FIG. 8g is a perspective view of the plug holder of FIG. 8c being used in conjunction with the embodiment of FIG. 8a.

DETAILED DESCRIPTION

Various aspects of the technology will now be described with reference to the figures. For the purposes of illustration, components depicted in the figures are not necessarily drawn to scale. Instead, emphasis is placed on highlighting the various contributions of the components to the functionality of various aspects of the technology. A number of possible alternative features are introduced during the course of this description. It is to be understood that, according to the knowledge and judgment of persons skilled in the art, such alternative features may be substituted in various combinations to arrive at different embodiments.

INTRODUCTION

As noted above, the most common way to hang Christmas lights is to attach the lights or wires to gutters with clips by standing on a ladder and manually placing the clips in position. This raises a number of safety risks relating to working at height and a number of protocols have been formulated to mitigate the risk (e.g. OSHA FS-3662-2013—Ladder Safety: Reducing Falls in Construction: Safe Use of Stepladders Fact Sheet). However, reducing the need for ladders would correspondingly reduce the risk of hanging Christmas lights. Furthermore, the use of ladders increases the time and effort required to perform the task of hanging Christmas lights.

It may also be advantageous if the apparatus were simple and robust.

The present hanger clips may be configured to be remotely actuatable using a tool attached to a pole which can be manipulated from ground level.

In the description below, embodiments will be described in relation to hanging Christmas lights to gutters. It will be appreciated that other ornaments may be hung using this system such as wreathes, strings of baubles and Hallowe'en decorations. Likewise, it will be appreciated that ornaments may be hung on other protrusions, edges and surfaces such as shingles, banisters, window frames, and downpipes.

A number of embodiments are described below with reference to the figures. All terms have definitions that are reasonably inferable from the drawings and description.

First Embodiment

Figure 1:
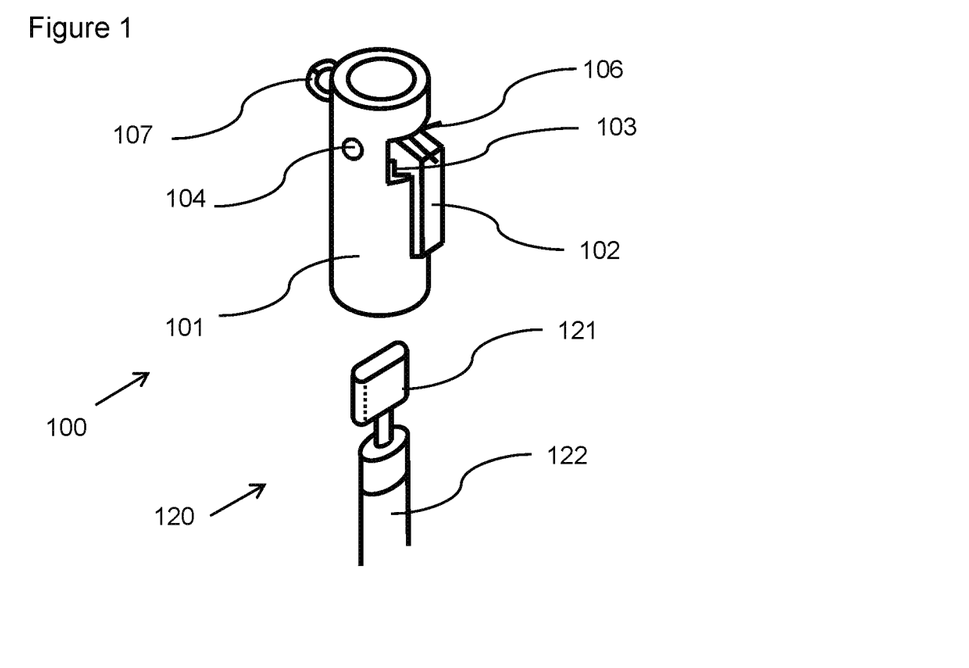
FIG. 1 is a perspective view of a first embodiment of a clip hanger and an associated control mechanism.

FIG. 1 is a perspective view of a first embodiment of a hanging clip. The hanging clip 100 in this case comprises: a housing 101, a clip member 102 connected to the housing 101 and comprising a follower 103, wherein the clip member 102 is configured to move between an open configuration and a closed configuration based on the position of the follower 103; wherein the housing and clip are configured to receive a cam member 121 which is configured to rotate within the housing 101 to change the position of the follower 103 to move the clip member between an open configuration and a closed configuration.

The follower in this case is a surface configured to abut a curved surface of the cam member (when being opened or closed). The follower (also known as a cam follower) may be considered to be a type of surface, roller or needle bearing designed to follow the cam profile as the cam rotates. The follower may be smooth so as to reduce friction with the cam. Smooth may encompass flat surfaces, which are free from projections, lumps, or indentations.

In this case, the clip member is attached to the housing by a pivot and is biased towards the closed position by means of a spring 106. This means that when the cam member is separated from the housing the clip is biased to the closed position. In this case the spring has a helical portion which surrounds the pivot 104. This holds the spring in place. It will be appreciated that other biasing means may be used such as elastic (e.g. rubber).

In this case, the housing (which is substantially cylindrical in shape) comprises an axial open channel to receive the cam member which is mounted on top of a pole 122. In this embodiment, the cam member can be retrofitted onto a conventional pole (e.g. a broom or mop handle) to allow the device to be used. For example, the cam member may be glued, nailed and or screwed onto a pole (e.g. the cam member may be attached to a ¾" #5 male or female connector).

The cam member may be considered to be a rotating or sliding piece (e.g. an eccentric wheel or a cylinder with an irregular shape) in a mechanical linkage, particularly when used in transforming rotary motion into linear, transverse or reciprocal motion or vice versa. In this case, the cam member has a rounded-rectangle transverse cross-section. This means that the cam member has 2-fold rotational symmetry. It will be appreciated that other cams may have other degrees of rotational symmetry.

The hanger clip also comprises a hook 107 or other ornament connector for connecting with the Christmas lights (or other ornament). In this case, the ornament connector 107 is a loop for receiving the wire attached to the lights. The wire can be attached to the loop connector prior to the clip member being raised on the pole 122 and attached to the gutter.

Figure 2A:
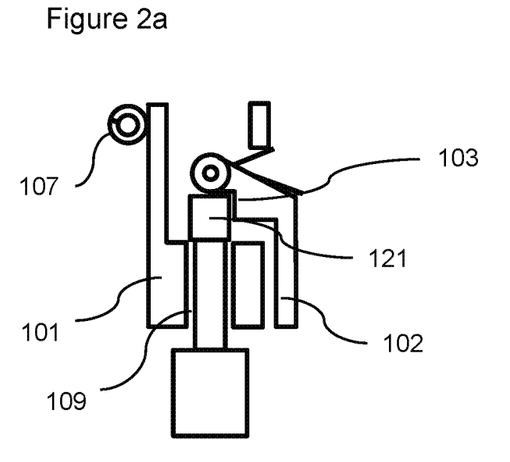
FIGS. 2a and 2b are longitudinal and transverse cross-sections of the clip hanger and control mechanism of FIG. 1 when the clip hanger is in the closed configuration.
Figure 2B:
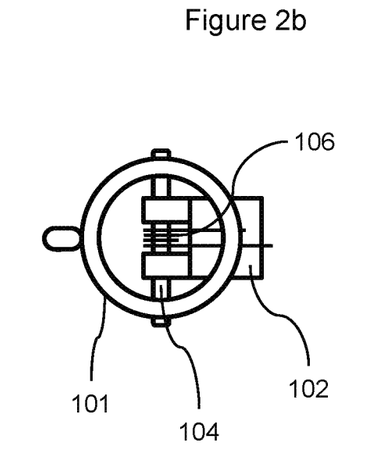
Figures 2C, 2D, 3A:
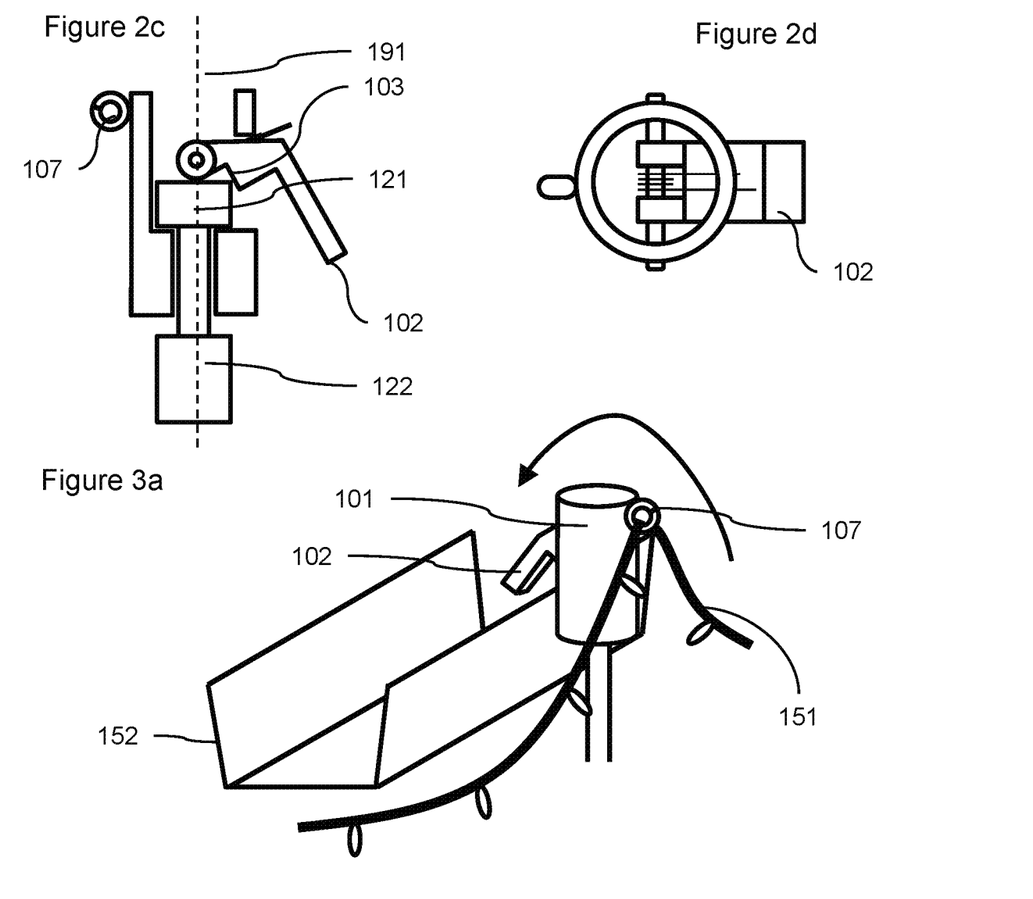
FIGS. 2c and 2d are longitudinal and transverse cross-sections of the clip hanger and control mechanism of FIG. 1 when the clip hanger is in the open configuration.
FIGS. 3a and 3b are perspective views of the clip hanger and control mechanism as the clip hanger of FIG. 1 is being attached to a gutter in order to hang a string of lights.

FIG. 2a-2d show how the cam member is used to move the clip between open and closed configurations. FIGS. 2a and 2b represent the control mechanism 120 in conjunction with the clip member 102 when in a closed position. FIG. 2a is a longitudinal cross section and FIG. 2b is a transverse cross-section (through pivot 104). FIGS. 2c and 2d represent the control mechanism 120 in conjunction with the clip member when in an open position. FIG. 2c is a longitudinal cross section and FIG. 2d is a transverse cross-section.

FIGS. 2a and 2b show when the cam member 121 has just been introduced into the housing 101 or body of the clip member 100 via a hole 109 in the bottom of the housing. In this case, the hole 109 is an elongate slot which only allows the cam member to be removed when the clip member is in the closed position. This couples the control mechanism to the clip member until the clip has safely been attached to the guttering.

When the cam member 121 is inserted into the clip hanger 100 housing it is automatically aligned with the follower on the clip when it is inserted into the clip housing 100 to the maximum extent. In this case, the extent to which the cam can be inserted into the housing is restricted by the cam impinging on the bottom of the clip member 102 just below the pivot 104. It will be appreciated that other mechanisms may be used to restrict the degree of insertion. For example, in other embodiments, the cam may be aligned when the top of the pole impinges on the bottom of the clip hanger housing.

When the cam member 121 is rotated (90° in this case) by rotating the pole 122 as shown in FIGS. 2c and 2d, the cam moves the follower 103 laterally away from the axis 191 of the clip housing. This causes the clip member 102 to pivot open so that the arm of the clip is further away from the outside of the housing. This step can be done by hand on the ground by rotating the pole with respect to the clip hanger. It will be appreciated that the degree of rotation required to open and close the clip member is related to the shape of the cam member.

Figure 3B:
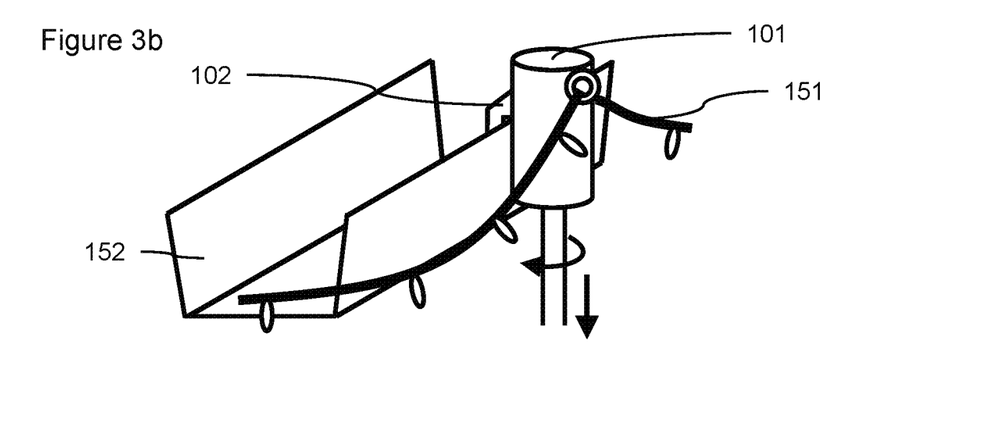

FIGS. 3a and 3b show how the hanging clip may be raised and attached to a guttering. FIGS. 3a and 3b also show a string of lights 151 attached to the ornament connector 107. It will be appreciated that other clips may be configured to attach to other exposed layers (e.g. shingles).

First the cam member is inserted into the clip hanger and turned (90° in this case) locking the clip member in the open position. When the cam member 121 is holding the clip member 102 in the open position, the hanging clip 100 can be raised by the pole of the control mechanism and positioned over the gutter.

The cam member can then be rotated back by rotating the pole to move the clip to the closed position to exert a grabbing force on the guttering 152 which is thereby trapped between the outside of the housing 101 and the clip arm 102. The cam member can then be removed, and the next clip attached.

The housing may be 4-12 cm tall. The housing may have a diameter of 4-8 cm. In this case, the housing has a circular cross section. Other embodiments may have a rectangular or square cross section.

In this case, the housing is made of plastic. It will be appreciated that other embodiments may be formed from metal.

Fixed-Clip Embodiment

Figure 4A:
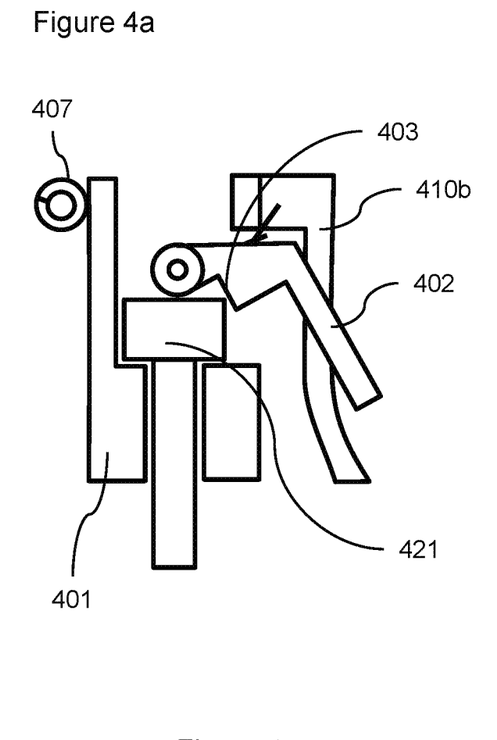
FIGS. 4a and 4b are longitudinal and transverse cross-sections of a further embodiment of a clip hanger and control mechanism when the clip hanger is in the open configuration.
Figure 4B:
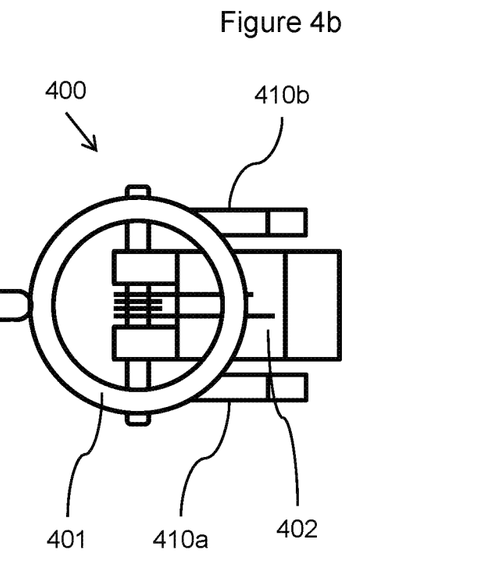
Figure 4C:
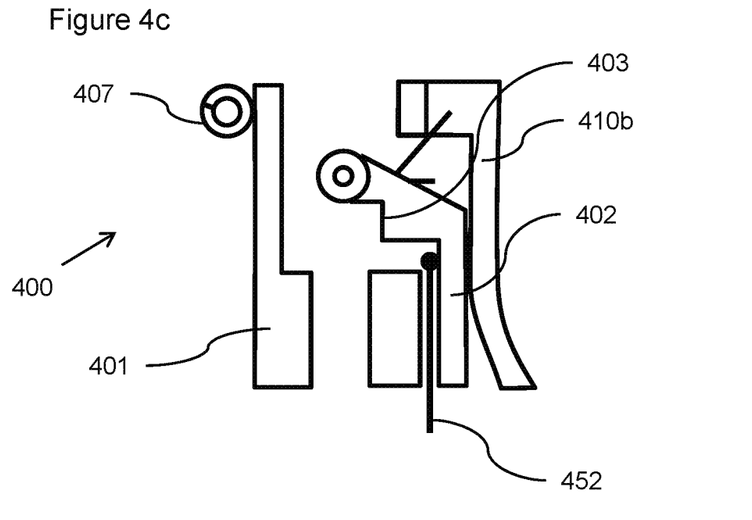
FIG. 4c is a longitudinal cross-section of the clip hanger of FIG. 4a when the clip hanger is in the closed position over a gutter.

FIGS. 4a-c show a further embodiment of a clip hanger 400 which comprises fixed clip members 410a,b. In this case, there is one fixed clip member 410a,b positioned on each side of the adjustable clip member 402. The fixed clip members 410a,b are rigidly attached to the clip housing 401 and are configured to maintain the housing in position as the cam member 421 is rotated via the control mechanism.

FIGS. 4a-b show the hanging clip 400 in the open configuration. In this configuration, the cam member 421 has been inserted and rotated to open the adjustable clip 402 member to the open position. This moves the adjustable clip member beyond the fixed clip members so that the hanging clip can be easily positioned on the gutter (or other surface). In this case, the fixed clip members are flared outwards at the bottom to facilitate positioning over the gutter.

When the hanger clip is in position, the cam is rotated thereby releasing the adjustable clip member which is biased closed. This traps the gutter 452 between the closed clip member and the outside of the housing. In this configuration, the connection between the gutter and the hanger clip is primarily through the force applied by the biased clip member 402. The distance between the housing 401 and the adjustable clip member 402 in the closed position is less than the distance between the housing 401 and the fixed clip member 410a,b. In contrast, the distance between the housing 401 and the adjustable clip member 402 in the open position (see FIG. 4a) is more than the distance between the housing and the fixed clip member 410a,b.

When the user would like to take the lights down, the fixed clips 410a,b may help stabilize the hanger clip as the cam member 421 is rotated within the housing 401. That is, as the adjustable clip member 402 is opened, the extra space between the housing and the adjustable clip member may allow the housing 401 to rotate making it more difficult to fully open the clip member. In this embodiment, the fixed clip members limit rotation of the housing with respect to the gutter.

Stop Embodiment

Figure 5A:
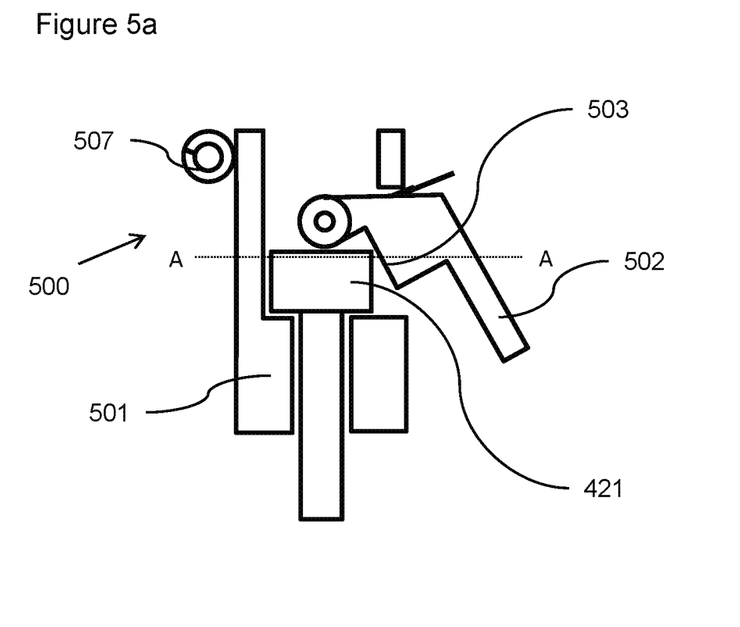
FIGS. 5a and 5b are longitudinal and transverse cross-sections of a further embodiment of a clip hanger.
Figure 5B:
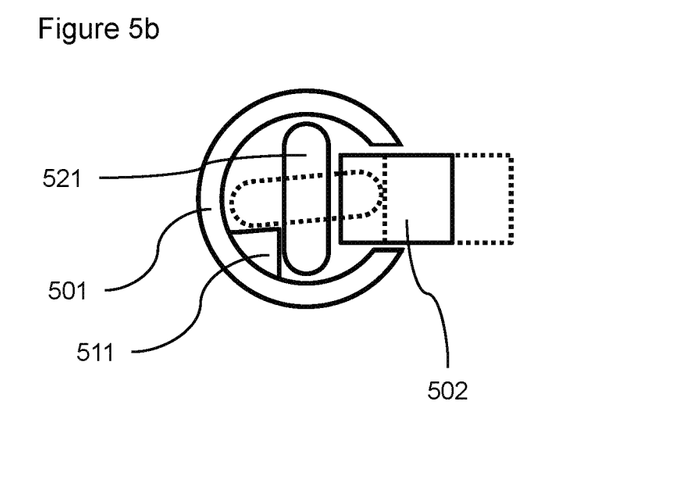

FIGS. 5a-b show a further embodiment of a hanger clip 500. FIG. 5a shows a longitudinal cross-section and FIG. 5b shows a transverse cross-section corresponding to the line A-A in FIG. 5a. In FIG. 5b, the dotted lines correspond to the position of the cam and the clip member when in the open configuration. This embodiment is similar to that of FIG. 2a. However, this embodiment also comprises a stop 511 configured to restrict rotational movement of the cam member 521 within the housing 501.

As with the embodiment of FIG. 2a, the cam member is inserted into the housing and rotated to open the adjustable cam member to an open configuration. However, in this case, a stop within the housing prevents the cam member over-rotating and allowing the clip member 502 to close again. In this case, the stop 511 is configured to allow the cam member 521 to rotate slightly over 90°. This allows the biased clip member 502 to apply a force to lock the cam member in position between the stop and the biased clip member. This may help the cam member to retain its position holding the clip member open has the hanger clip is raised and positioned on the gutter (or other protrusion).

Plastic Embodiment

FIGS. 6a-e show a further embodiment. In this case, the embodiment is of unitary plastic construction. In this case, the material is polypropylene plastic and the clip is injection molded.

Figure 6A:
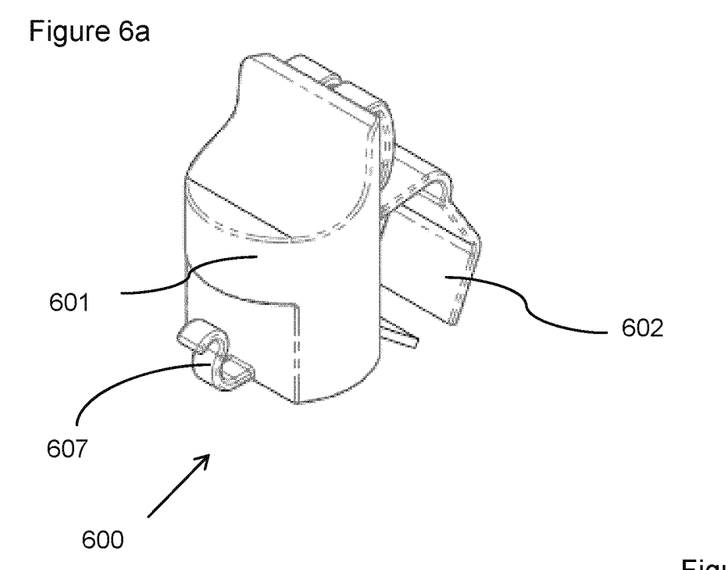
FIG. 6a is a perspective view of a further embodiment of a clip hanger.
Figure 6B:
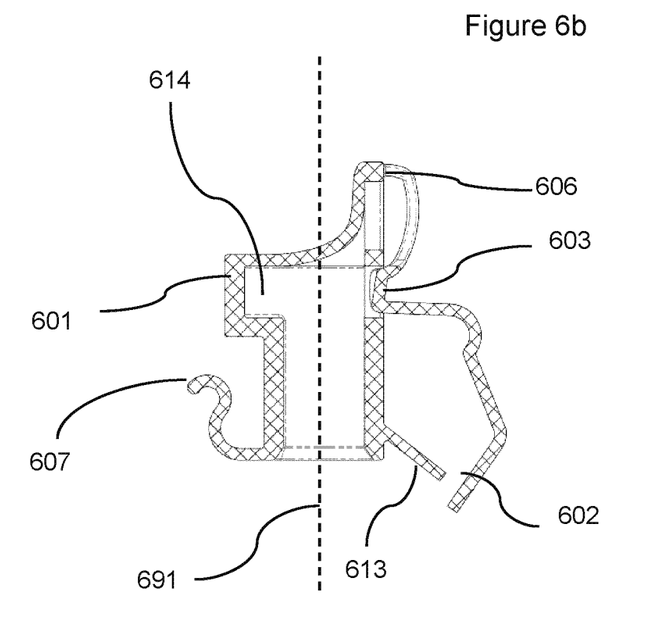
Figure 6C:
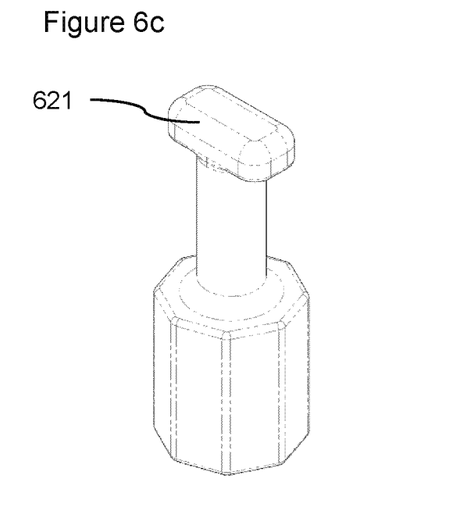
Figure 6D:
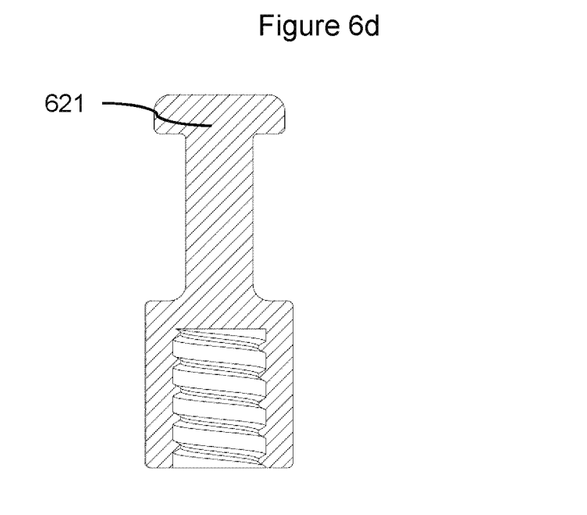
FIG. 6d is a longitudinal cross-section of the cam member of FIG. 6c.

FIG. 6a is a perspective view of a further embodiment of a hanging clip. FIG. 6b shows a cross-section view of the clip of FIG. 6a. FIGS. 6c and 6d show the cam member 621 which can be used to activate this embodiment 600. FIG. 6d shows this embodiment 600 being positioned on a gutter using the cam member 621.

The hanging clip 600 in this case comprises: a housing 601, a clip member 602 connected to the housing 601 and comprising a follower 603, wherein the clip member 602 is configured to move between an open configuration and a closed configuration based on the position of the follower 603; wherein the housing and clip are configured to receive a cam member 621 which is configured to rotate within the housing 601 to change the position of the follower 603 to move the clip member between an open configuration and a closed configuration.

Figure 6E:
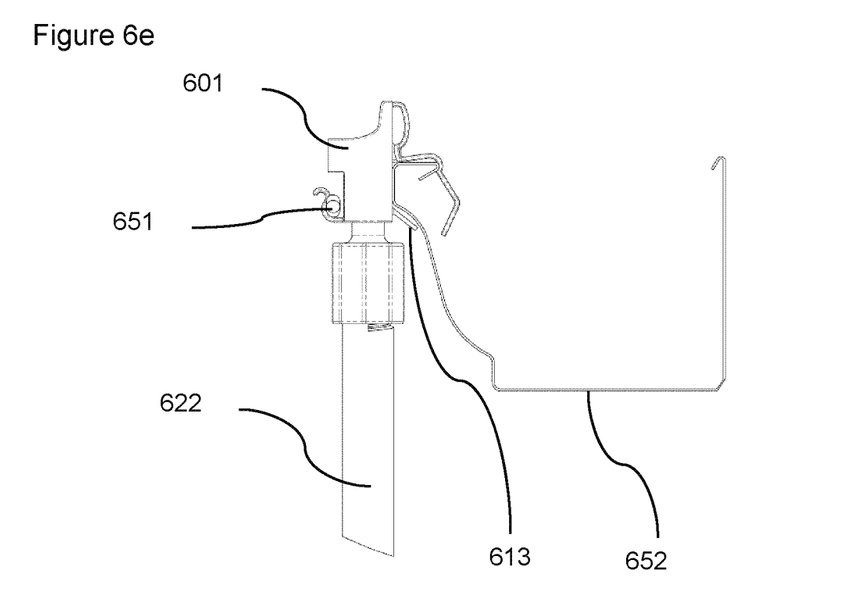
FIG. 6e is a side view of the clip hanger and control mechanism as the clip hanger of FIG. 1 is being attached to a gutter in order to hang a string of lights.

In this case, the clip member 602 is shaped to engage with a standard eaves trough guttering shape (see FIG. 6e). The clip in this case also includes rigid supporting member 613 which is configured to sit under a portion of the guttering 652 and provide an opposing force to that applied by the clip member. That is, in this case, the clip member 602 and the rigid supporting member are opposed to each other when the clip is in place. This is shown in FIG. 6e.

The follower 603 in this case is a surface configured to abut the curved surface of the cam member 621.

This embodiment also comprises a recess 614 which is positioned opposite the follower 603 within the housing 601. This housing receives an opposing portion of the cam member 621 when the cam is rotated to open the clip member by displacing the follower 603. This restricts motion of the cam member along the rotation axis when the clip is in the open configuration. That is, the recess 614 (in conjunction with the gap in the housing which receives the follower 603) has surfaces (aligned transverse to the rotation axis) which prevent the cam being pushed further into the housing and/or being removed from the housing. The recess in this case also has surfaces which are aligned with the rotation axis 691 which prevent lateral motion of the cam 621 as it is being rotated within the housing 600.

In this case, the clip member is attached to the housing by a pivot and is biased towards the closed position by means of a spring 606. This means that when the cam member is separated from the housing the clip is biased to the closed position. In this case the biasing means is a resilient portion of the material which is configured to elastically bend.

In this case, the housing (which is substantially cylindrical in shape) comprises an axial open channel to receive the cam member which is mounted on top of a pole 622. In this embodiment, the cam member can be retrofitted onto a conventional pole (e.g. a broom or mop handle) to allow the device to be used. For example, the cam member may be glued, nailed and or screwed onto a pole (e.g. the cam member may be attached to a ¾" #5 female connector). In this case, the cam member is screwed onto the pole as shown in FIG. 6c.

The hanger clip also comprises a hook 607 or other ornament connector for connecting with the Christmas lights 651 (or other ornament). In this case, the ornament connector 607 is a loop for receiving the wire attached to the lights. The wire can be attached to the loop connector prior to the clip member being raised on the pole 622 and attached to the gutter 652 as shown in FIG. 6e.

Two-Part Construction Embodiment

Figure 7A:
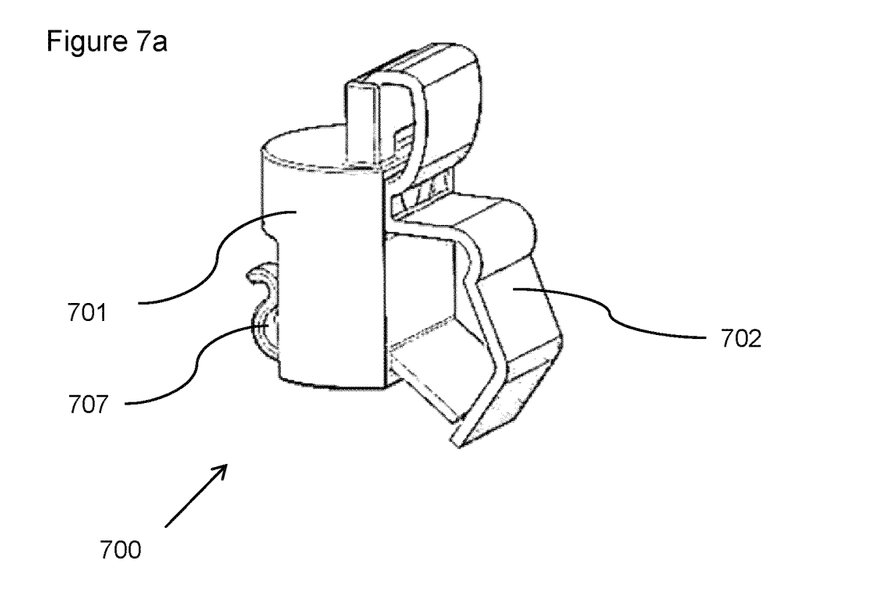
FIGS. 7a and 7b are perspective and cross-section views of a further embodiment of a clip hanger.
Figure 7B:
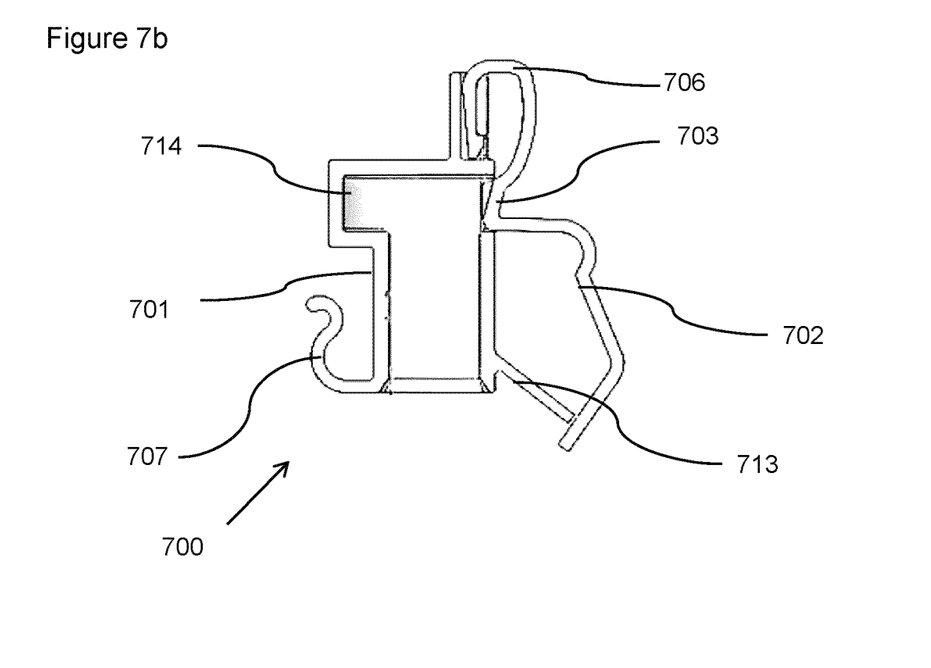

FIGS. 7a-b show a further embodiment. FIG. 7a is a perspective view of the hanging clip. FIG. 7b shows a cross-section view of the clip of FIG. 7a. In this case, the embodiment is of two-part plastic construction. In this case, the material is polypropylene plastic and is injection molded.

The hanging clip 700 in this case comprises: a housing 701, a clip member 702 connected to the housing 701 and comprising a follower 703, wherein the clip member 702 is configured to move between an open configuration and a closed configuration based on the position of the follower 703; wherein the housing and clip are configured to receive a cam member which is configured to rotate within the housing 701 to change the position of the follower 703 to move the clip member between an open configuration and a closed configuration.

In this case, the clip member 702 is shaped to engage with a standard eaves trough guttering shape. The clip in this case also includes rigid supporting member 713 which is configured to sit under a portion of the guttering and provide an opposing force to that applied by the clip member. That is, in this case, the clip member 702 and the rigid supporting member are opposed to each other when the clip is in place.

Like the embodiment in FIGS. 6a-e, the follower 703 in this case is a surface configured to abut the curved surface of the cam member.

This embodiment also comprises a recess 714 which is positioned opposite the follower 703 within the housing 701. This housing receives an opposing portion of the cam member when the cam is rotated to open the clip member by displacing the follower 703. This restricts motion of the cam member along the rotation axis when the clip is in the open configuration.

In this case, the clip member is attached to the housing by a pivot and is biased towards the closed position by means of a spring 706. This means that when the cam member is separated from the housing the clip is biased to the closed position. In this case the biasing means is a resilient portion of the material which is configured to elastically bend.

Unlike the previous embodiment, this embodiment is formed from two parts: the housing section 701 and the clip portion 702. The clip is designed to be inserted through the top of the housing section 701 and it has an engaging protrusion which engages with an indent on the clip side of the housing section 701. This means that when the clip portion is in a closed configuration, the spring 706 applies a force between the engaging protrusion and the corresponding indent. When the clip portion is in an open configuration, the spring 706 applies a stronger force between the engaging protrusion and the corresponding indent. This means that the union between the two parts of the hanger clip is stronger when the clip portion is open. This is important because when the hanger clip is not installed, the weight of the lights (or other articles being hung) can be supported by the housing, whereas when the hanger clip is installed, the clip supports the weight of the hanger housing and the weight of the articles being hung. Making the force between the two components increase when the hanger clip is open may mean that the hanger clip is stronger when installed and that the clip can still be easily replaced when the clip hanger is closed.

In other embodiments, the clip section may be inserted up into a top region of the clip hanger housing. In this way, when weight is placed on the housing (e.g. by hanging an article) the housing rests more securely on the clip member.

Plug Attachment

Like FIGS. 7a-b, FIGS. 8a-b show a further two-part embodiment. The hanging clip 800 in this case comprises: a housing 801, a clip member 802 connected to the housing 801 and comprising a follower 803, wherein the clip member 802 is configured to move between an open configuration and a closed configuration based on the position of the follower 803; wherein the housing and clip are configured to receive a cam member which is configured to rotate within the housing 801 to change the position of the follower 803 to move the clip member between an open configuration and a closed configuration. In this case, the clip housing includes two hooks 807a,b or other ornament connector for connecting with the Christmas lights (or other ornament).

Figures 8A, 8B, 8C:
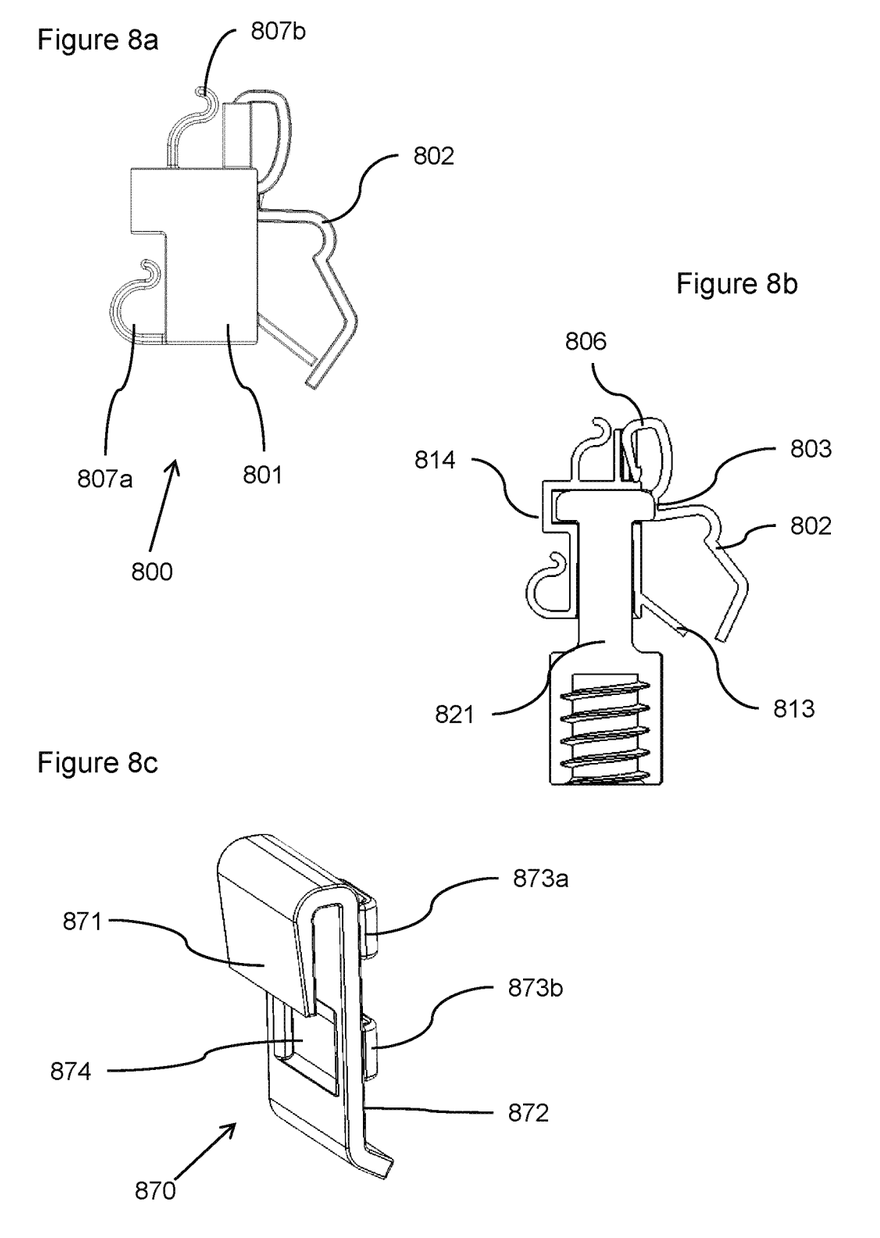

FIG. 8c shows an alternative plug holder 870 which can replace the clip member by separating the clip member from the two-part hanger clip and inserting the plug holder. As shown in FIG. 8c, the plug holder comprises an engagement member 871 for securely connecting the plug holder 870 to the housing 871.

When the plug holder 870 is connected to the housing 871, a plug can be inserted into the plug holder so that the plug 809 can be raised on a cam mounted on a pole for insertion into sockets located, for example, under roof eaves.

Figure 8D:
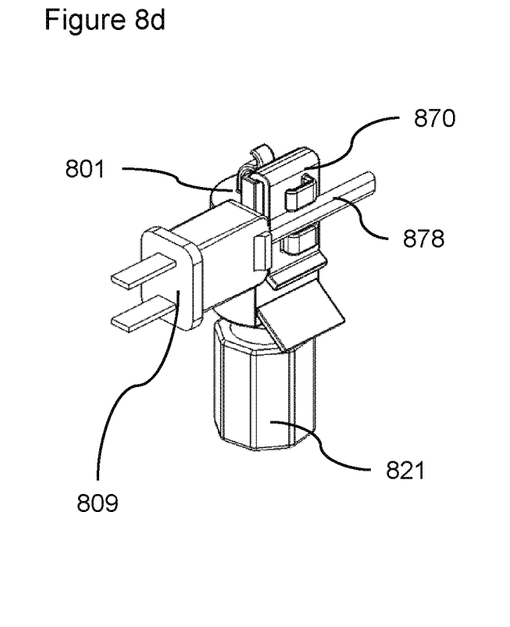
Figure 8E:
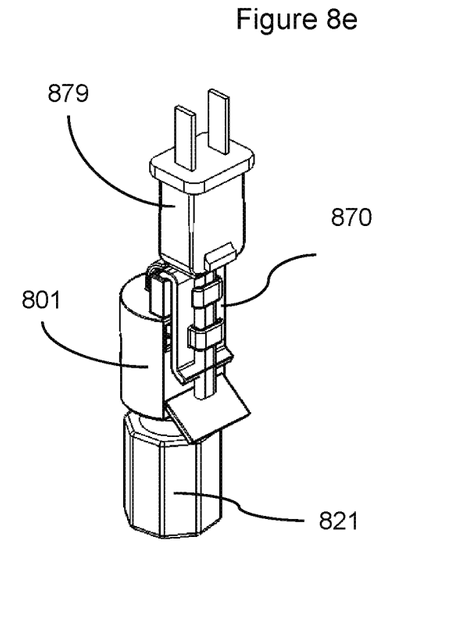
Figure 8F:
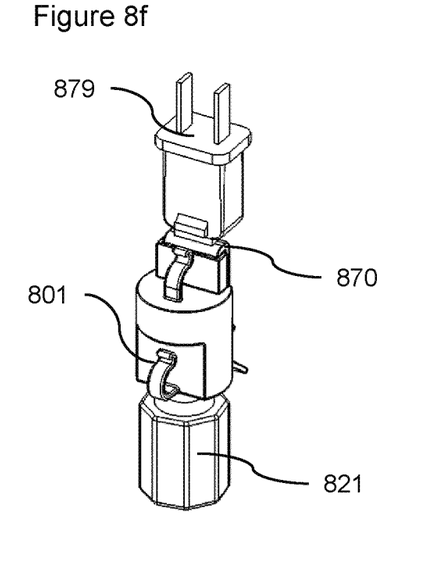
Figure 8G:
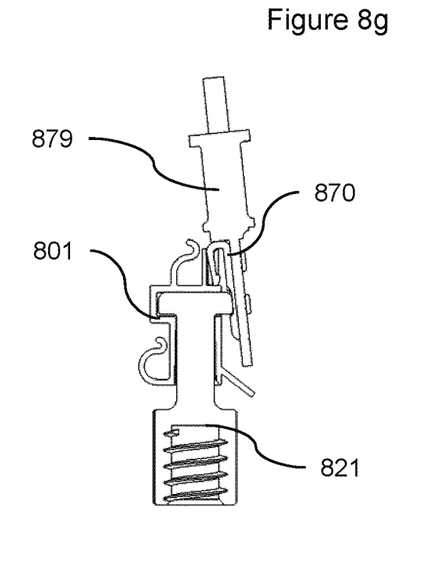

In this case, the plug holder 870 includes two securing members 873a,b. Each of the securing members 873a,b is open at one end and lies substantially parallel to a cable supporting surface. In this case the securing members are open at opposite sides. Therefore, to insert the plug cable into the plug holder, the plug is arranged transverse to the plug holder as shown in FIG. 8d. Then the plug cable 878 is rotated to be aligned with the plug holder (by approximately 90°). In this way, the cable is inserted through the open ends of the securing members and is secured between the securing members 873a,b and the cable supporting surface 872. The plug is positioned above the plug holder as shown in FIGS. 8e-g which allows a force to be applied to the plug prongs through the plug body 879. It will be appreciated that there may be other ways of attaching the plug and/or plug cable to the plug holder.

It will be appreciated that the plug holder 870 may include a space 874 to receive the cam when it is rotated within the body 801. This space 874, in conjunction with recess 814 allows the cam to rotate within the housing and then provide a pulling force to remove the plug from the socket. The space also helps stabilize the plug holder with respect to the cam.

In this way, the same housing may be used in conjunction with a variety of tools such as a clip or a plug holder.

Although the present invention has been described and illustrated with respect to preferred embodiments and preferred uses thereof, it is not to be so limited since modifications and changes can be made therein which are within the full, intended scope of the invention as defined by the claims as understood by those skilled in the art.

The invention claimed is:

1. A hanger clip comprising:
    a housing,
    a clip member connected to the housing and comprising a follower, wherein the clip member is configured to move between an open configuration and a closed configuration based on the position of the follower;
    wherein the housing and clip member are configured to receive a cam member which is configured to rotate within the housing to change the position of the follower to move the clip member between an open configuration and a closed configuration.

2. The hanger clip of claim 1 wherein the clip member is pivotably connected to the housing.

3. The hanger clip of claim 1 wherein hanger clip comprises a biasing means configured to bias the clip member in a closed configuration.

4. The hanger clip of claim 3, wherein the biasing means comprises a spring.

5. The hanger clip of claim 1 wherein the housing comprises one or more stops configured to restrict rotational motion of the cam member within the housing.

6. The hanger clip of claim 5, wherein the stop is configured to stop the cam member in a position in which the clip member is configured to exert a force on the cam member to hold it in position.

7. The hanger clip of claim 1, wherein the clip member is configured to exert a force on an exterior portion of the housing when in the closed configuration.

8. The hanger clip of claim 1, wherein the clip member extends towards a hole through which the cam member is received.

9. The hanger clip of claim 1, wherein the clip member extends away from a hole through which the cam member is received.

10. The hanger clip of claim 1, wherein the clip hanger comprises one or more fixed clip members configured to restrict rotation of the clip hanger when the clip member is in the open configuration.

11. The hanger clip of claim 10, wherein:
    the distance between the housing and the adjustable clip member in the closed configuration is less than the distance between the housing and the fixed clip member; and
    and the distance between the housing and the adjustable clip member in the open configuration is more than the distance between the housing and the fixed clip member.

12. The hanger clip of claim 1, wherein at least a said clip member is flared.

13. The hanger clip of claim 1, wherein the clip member comprises an ornament connector.

14. The hanger clip of claim 1, wherein the clip member of unitary construction.

15. The hanger clip of claim 1, wherein the housing and clip member are releasably connected together by an engagement member.

16. A method of using the clip hanger of claim 1 comprising:
    inserting the cam member into the housing; and rotating the cam member within the housing to change the position of the follower to move the clip member between an open configuration and a closed configuration.

* * * * *